United States Patent [19]

Graf

[11] Patent Number: 5,460,242

[45] Date of Patent: Oct. 24, 1995

[54] LUBRICANT DISPENSER WITH GAS-CONTROLLED FEED OF LUBRICANT TO A MACHINE

[75] Inventor: Walter Graf, Euerdorf, Germany

[73] Assignee: Satzinger GmbH & Co., Euerdorf, Germany

[21] Appl. No.: 276,084

[22] Filed: Jul. 15, 1994

[30] Foreign Application Priority Data

Sep. 21, 1993 [DE] Germany ............... 43 31 947.5

[51] Int. Cl.[6] ............... F16N 11/10; F16N 13/16
[52] U.S. Cl. ............... 184/29; 222/389
[58] Field of Search ............... 184/29, 39; 222/389

[56] References Cited

U.S. PATENT DOCUMENTS

| | | | |
|---|---|---|---|
| 4,023,648 | 5/1977 | Orlitzky et al. | 222/389 |
| 4,671,386 | 6/1987 | Orlitzky | 184/39 |
| 5,102,897 | 5/1991 | Jorissen | 184/39 |

FOREIGN PATENT DOCUMENTS

| | | |
|---|---|---|
| WO89/08800 | 9/1989 | European Pat. Off. |
| 3811469 | 10/1989 | Germany . |
| 3532335 | 11/1989 | Germany . |
| 3718341 | 1/1991 | Germany . |
| 4209776 | 9/1993 | Germany . |

*Primary Examiner*—Thomas E. Denion
*Attorney, Agent, or Firm*—Herbert Dubno

[57] ABSTRACT

A cartridge containing a current-generating cell and a gas-generating cell electrically connected therewith is received in a cylindrical seat of a bottom part of a unit fitting into an end of a lubricant receptacle housing and closing this end thereof. The lubricant receptacle housing can be connected by a fitting at the opposite end of a machine to be lubricated. The unit has a cover cap on its bottom part which can be forced off the latter when gas is generated in the unit to displace the lubricant out of the housing.

8 Claims, 4 Drawing Sheets

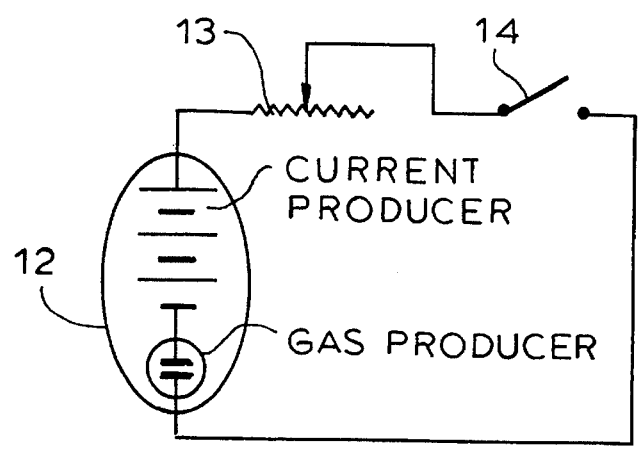
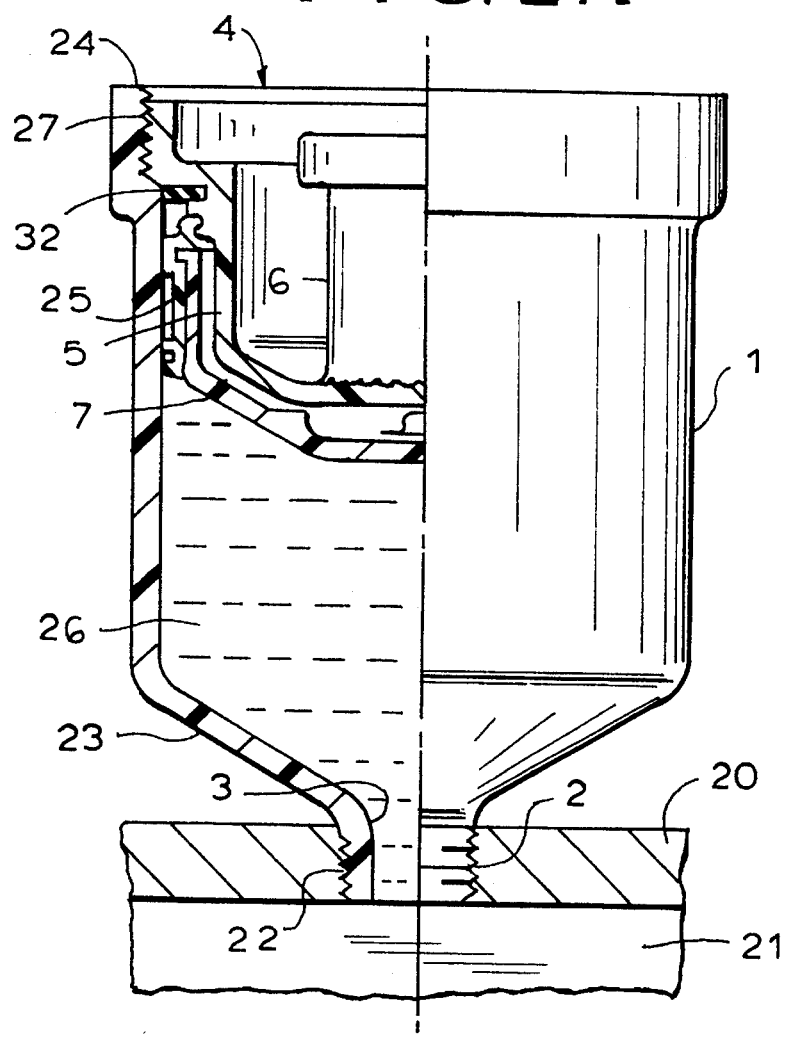

LUBRICANT DISPENSER WITH GAS-CONTROLLED FEED OF LUBRICANT TO A MACHINE

CROSS REFERENCE TO RELATED APPLICATION

This application is related to my commonly-assigned copending application Ser. No. 08/033,630 filed Mar. 16, 1993 (now U.S. Pat. No. 5,386,883 of Feb. 7, 1995).

FIELD OF THE INVENTION

My present invention relates to a lubricant dispenser for the gas-controlled feed of a lubricant to a machine. More particularly this invention relates to a lubricant dispenser which is mounted on a machine and feeds the lubricant to a source of pressure which displaces a piston progressively forcing the lubricant out of a receptacle.

BACKGROUND OF THE INVENTION

A lubricant dispenser of the aforedescribed type can comprise a housing or receptacle for a flowable lubricant, e.g. oil or grease, which has a fitting enabling connection of the receptacle to a part of the machine and provided with a lubricant passage through which the lubricant is delivered to the machine.

On the opposite side of the receptacle, a pressurizing source is provided and between the pressurizing source and lubricant, a piston is located for forcing the lubricant progressively out of the receptacle and, more particularly, displacing the lubricant from the passage at a certain rate or quantity of lubricant per unit time. The source of pressure can be a gas generator and when the latter is set in operation, causes slow, long-term and continuous release of the lubricant terminating with the end of gas generation. It will be understood, of course, that the generation of gas can also be interrupted in the course of lubrication as may be required.

In one known system for dispensing lubricant (see German patent document DE 38 11 469 A1 and U.S. Pat. No. 5,012,897), the housing is closed on its side opposite the connecting fitting by a bottom formed on the receptacle. This bottom has a central recess or cutout. The connecting fitting is formed in a cover engaging the wall of the receptacle or housing and held thereon by a fold seam. The gas-generating means does not form an independent unit and comprises a bottom part and an elastic hood which is connected with the bottom part.

In the bottom part of the gas generator a cartridge seat is provided, this seat being closed off from the elastic hood by a partition. The space between the source and the hood is filled with a gas-generating liquid and hood and its associated parts are mounted prior to insertion of the cover in the housing. The piston is then inserted into the housing and the cover with its connecting fitting is applied.

The piston is not directly pressurized by the gas but rather is pressed against the lubricant by the expanding elastic hood, the latter being inflated by the development of gas from the liquid.

In the central recess of the bottom, a cartridge is introduced and can be screwed into the seat, the partition rupturing or being otherwise destroyed. The cartridge itself has a space for the gas-generating elements and closed by a membrane-like wall which is galvanically destroyed when the cartridge is screwed into place and the gas-generating liquid comes into contact with this partition wall.

In practice this construction of a lubricant dispenser has been found to be expensive to fabricate and excessively complex. It can be improved operationally as well since the gas pressure is partly dissipated in this system by the need to expand the hood via elastic deformation.

In German patent document DE 37 18 341 C2, another type of lubricant dispenser is provided in which the gas generator is also not a self-contained or independent unit. Here the gas generator is a space within the receptacle or housing separated by the piston from the lubricant supply. The separated space serves to hold the generated gas and the gas generation is effected with the aid of a special gas-generating element which is disposed in the piston. The gas-generating element can be a electrolyte vessel in which a corrosion element which passes into solution with the generation of gas, is in contact with the electrolyte. Another type of gas-generating element which may be used in this case is an electrolyte vessel in which an anode and cathode are immersed in the electrolyte and which generates gas when an electric current is passed through the cell formed by the anode and cathode. For this purpose an appropriate electric circuit is provided.

In this embodiment as well, the connecting fitting is provided on a cover which is connected with the housing or receptacle wall by a fold seam. The cover is applied once the piston with its gas-generating element has been introduced into the housing or receptacle. From the bottom of the housing the electrical conductor extends outwardly. As a practical matter, this lubricant dispenser has not found widespread application.

Yet another lubricant dispenser is described in WO 89/08800 in which the gas generation produces a piston displacement and forces lubricant out of the receptacle in the manner described. The electrochemistry of the system, however, is somewhat different (see DE 35 32 335 C2). This system operates with so-called battery cells. Here the gas development can be induced or interrupted via the cutting in or cutting out of the battery in a simple manner. By the additional provision of an adjustable potentiometer, the gas generation and the lubricant flow rate can be controlled.

Finally, reference may be had to German patent DE 42 09 776.2 A1 and the aforementioned copending application which describes a gas-generating unit as a self-contained unit and which is comprised of a bottom part, a cartridge seat and a cover cap and which can be inserted into a recess of the housing to form a bottom thereof which can be removably anchored in the housing. The cover cap is so connected to the bottom part that it can be shoved off the latter upon the development of gas pressure in the cartridge or by the cartridge. The cover cap here functions as the lubricant displacing piston.

The device is so constructed that in the virgin state, the gas-generating cell is disposed in the space between the bottom part and the cover cap and includes a gas-generating liquid which comes into contact with an element producing the gas, this element being separated in the virgin state by a partition from the liquid. The partition is ruptured or destroyed by the actuation of a mechanical device for switching on the feed of lubricant from the receptacle so that the gas-generating element can come into contact with the gas-generating liquid and produce gas. The gas pressure which is thus produced drives the piston off the bottom and enables its displacement to force lubricant out of the container. This system has been found to be satisfactory but also requires improvement since the handling of a liquid-filled element and its fabrication is inconvenient.

OBJECTS OF THE INVENTION

It is the principal object of the present invention, therefore, to provide an improved lubricant dispenser which is comparatively inexpensive to manufacture, efficient to operate and reliable.

Yet another object of this invention is to provide a lubricant dispenser which combines the advantageous features of the prior art systems described but nevertheless is free from at least some of the drawbacks thereof.

SUMMARY OF THE INVENTION

These objects and others which will become apparent hereinafter are attained, in accordance with the present invention, with a lubricant dispenser which provides a battery-controlled gas-generating cell in a self-contained gas-generating unit which can be fitted into the receptacle at the end thereof opposite the end formed unitarily with the connecting fitting.

More particularly, the lubricant dispenser of the invention comprises a housing or receptacle for receiving the viscous lubricant to be dispensed, e.g. a lubricating oil or grease, a fitting for connecting that receptacle or housing at one side with a machine part to be lubricated, a gas-generating cell mounted on the opposite side of the housing and a piston fitted in the housing and whose movement by the generated gas controls the rate at which lubricant will be forced from the housing.

According to the invention, the gas-generating cell is provided with an independent unit which is constituted from a bottom part, a cartridge receptacle or seat and a cover cap, the unit being insertable in a recess or open end of the housing as a bottom closing this open end and removably anchored there. The cover cap can be displaced off the bottom part by the gas pressure and, in the cartridge seat, a cartridge is provided with the galvanic gas-generating element.

According to this invention, moreover, the cover cap simultaneously forms the piston and the gas-generating element is an operating battery received in the battery cell or compartment and which can be selectively turned on and off. Finally in accordance with the principles of this invention, the cover cap forms part of the unit inserted with the bottom into the open end of the receptacle opposite the fitting and, when the operating battery is turned on and gas development occurs, is forced off the bottom part for controlled dispensing of the lubricant.

The invention is based upon my discovery that the basic construction of a lubricant dispenser described in the aforementioned copending application and in DE 42 09 776.2 A1 allows, in a very simple way, the gas generation by an operating battery forming a gas generator cell, especially of the type describe in German patent 35 32 335 C2. The number of elements of the lubricant dispenser can thereby be reduced although, for that purpose, the number of elements which must be changed from the commercially-successful unit of the copending application is minimized.

The operating battery has a potentiometer resistance which also can be provided in the cartridge in accordance with a feature of the invention for controlling the rate of gas generation and hence the rate at which lubricant is dispensed.

For fabrication simplicity, it has been found to be advantageous to provide the cartridge as a cylindrical element which is threaded into the cylindrical seat of the bottom part and having a cover sealingly closing the cartridge which itself can hermetically seal against the seat. The cartridge can also have a cylindrical part which sealingly engages in a sleeve, which, in turn, can be threaded into the seat. The cartridge, the cylindrical sleeve and the other portions of the housing and receptacle can be fabricated in a simple manner by injection molding from a thermoplastic synthetic resin.

Thus a lubricant dispenser according to the invention can comprise:

a receptacle for a lubricant to be dispensed;

a machine-connection fitting on one side of the receptacle and provided with a passage communicating with lubricant in the receptacle for delivering the lubricant to the machine;

a gas-generating cell receivable in an opposite side of the receptacle and constituting a single unit mounted in the receptacle and replaceable as a unit therein, the gas-generating cell comprising:

- a bottom-forming part sealingly fitting in the receptacle and formed with a cartridge seat having an opening,
- a cap fitting over the bottom-forming part and engaging same, the cap forming a piston releasable from the bottom-forming part, displaceable in the receptacle and forcing the lubricant through the passage, and
- a gas-generating cartridge receivable in the cartridge seat and including an electric-current producing a gas-generating galvanic cell energizeable and deenergizeable controllably to produce gas driving the piston.

BRIEF DESCRIPTION OF THE DRAWING

The above and other objects, features, and advantages will become more readily apparent from the following description, reference being made to the accompanying drawing in which:

FIG. 2A is a view similar to FIG. 2 showing the gas-generating unit after insertion;

FIG. 5 is a circuit diagram illustrating the internal circuit within the cartridge.

SPECIFIC DESCRIPTION

Figure 1:
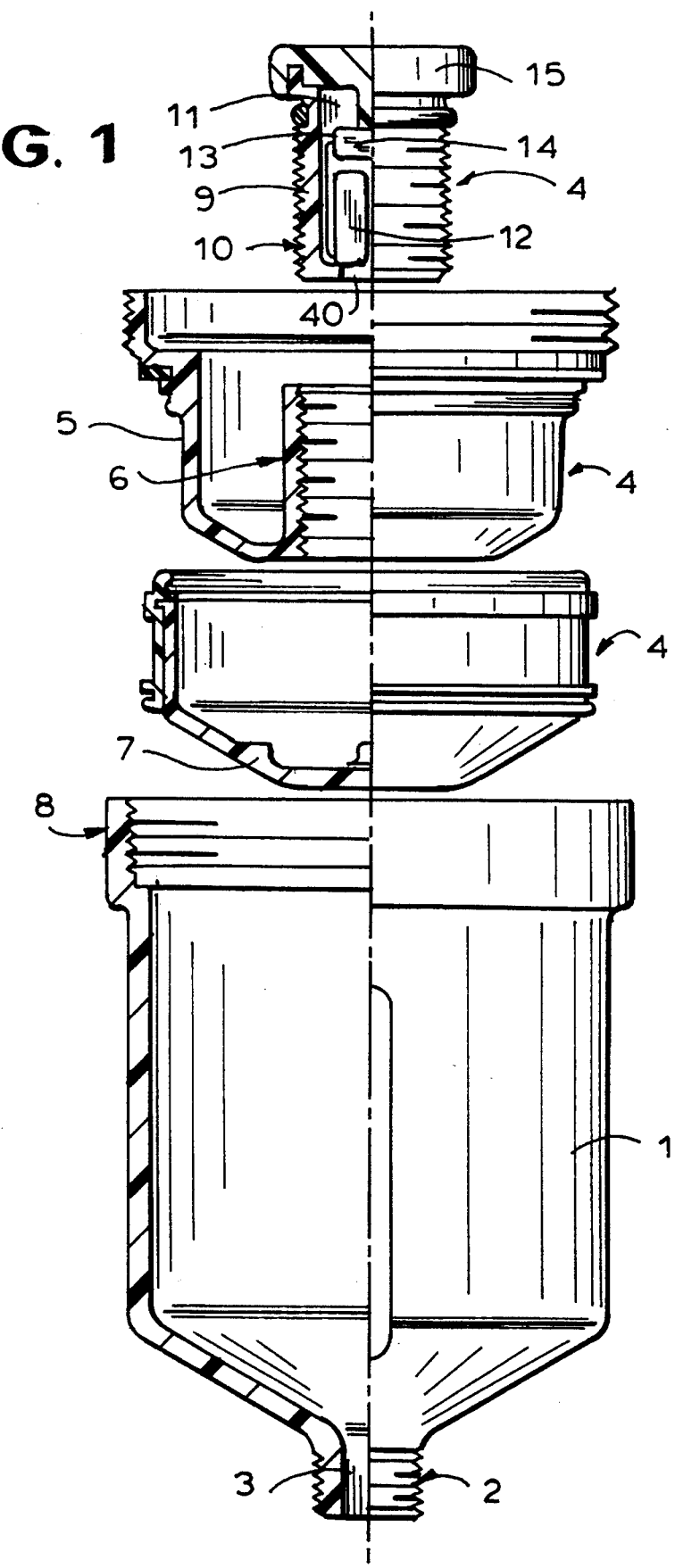
FIG. 1 is a partial vertical section and partial elevational view, in exploded form, of a lubricant dispenser according to the invention.
Figure 2:
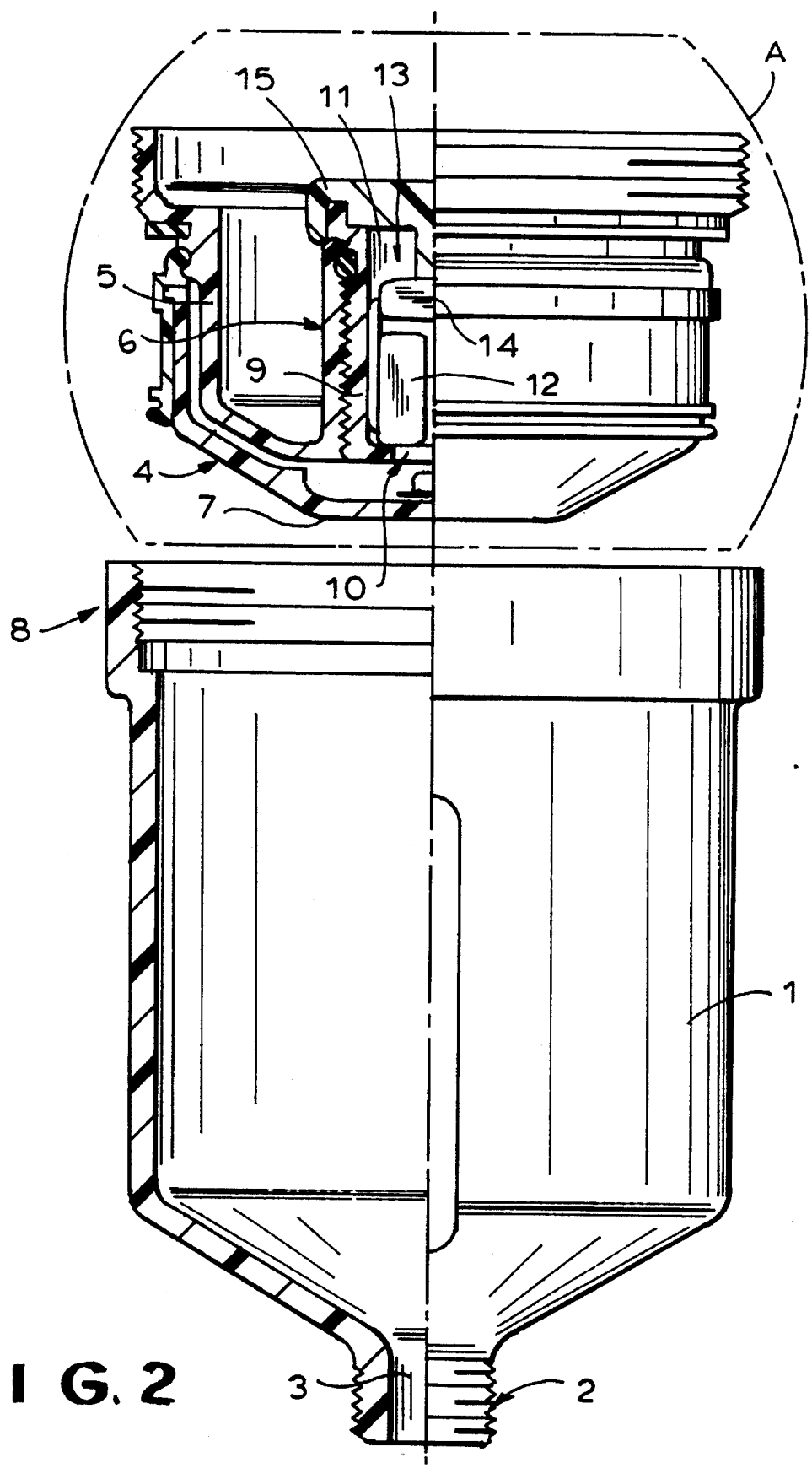
FIG. 2 is a view similar to FIG. 1 but showing the assembled gas-generating unit before insertion into the receptacle.
Figure 3:
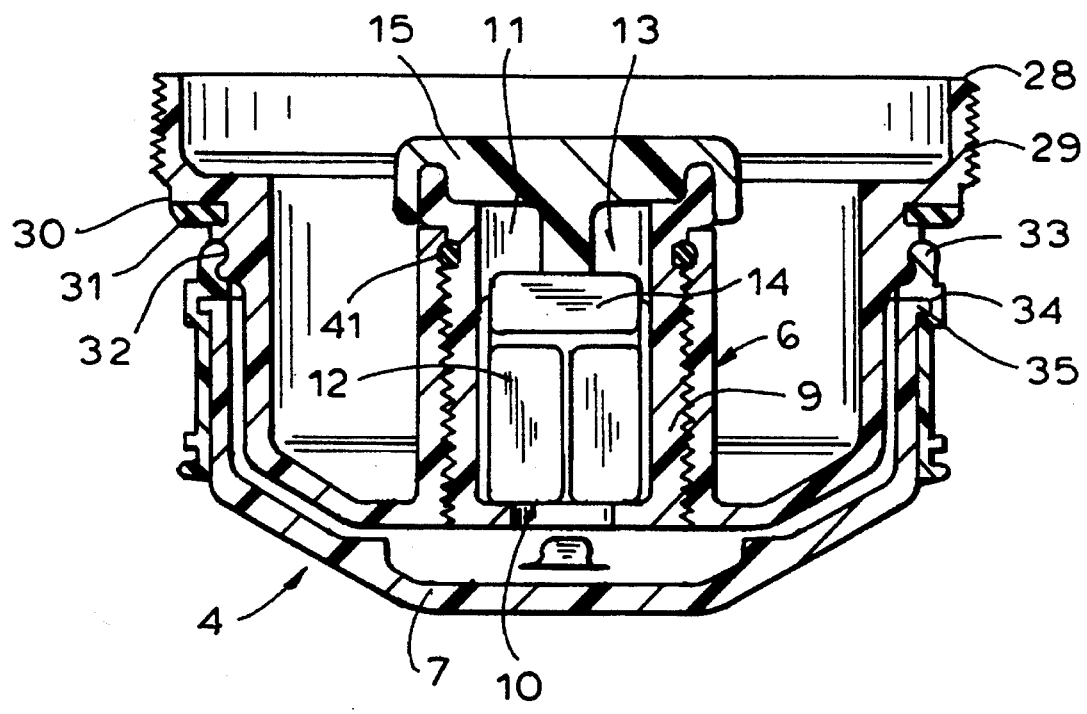
FIG. 3 is a section drive to an enlarged scale of the gas-generating unit of the device of FIGS. 1, 2 and 2A.

The lubricant dispenser shown in FIGS. 1–3 serves for the controlled feed of grease or another viscous lubricant to a machine. In FIG. 2A, the machine has been represented at 20 and can be seen to have a space 21 which is to receive the lubricant. The machine 20 has a threaded bore 22 into which a threaded fitting 2 of a housing or receptacle of the dispenser is screwed. In addition to the generally cylindrical and elongated housing or a receptacle 1, which has a frustoconical end wall 23 provided with the threaded fitting 2 and a lubricant feed passage 3 in this fitting, the basic elements of the device include a gas-generating cell 4 which is received in the opposite open side 24 of the housing. In the housing a piston 7 having a peripheral seal 25 engageable with a housing wall, is displaceable to drive the lubricant 26 from the receptacle at a controlled rate depending upon the rate of generation of a gas.

As can be seen from FIGS. 1 and 2, the gas-generating cell 4 is a self-contained unit which is mounted as such in the open end 24 of the housing 1 via an internal screw thread 27 of the housing.

The unit 4 comprises a bottom part 5 which is provided, as can be seen from FIG. 3, with a cylindrical upper end 28 having an external thread 29 engaging the internal screw thread 27 and a shoulder 30 against which a seal 31 is seated. That seal can rest against a shoulder 32 of the housing.

In addition, the bottom part 5 is formed with a circumferential indentation 32 in which an annular rib 33 of an elastomeric sliding seal 34 is engaged. The sliding seal 34, which is dimensioned to ride sealingly along the inner wall of the receptacle 1, engages an outwardly projecting flange 35 of a cover cap 7 which forms part of the unit 4.

The bottom part 5 of that unit 4 also comprises a cartridge seat 6 in the form of an internally-threaded upwardly-extending sleeve.

The unit 4 thus fits in the end of the housing 1 and is threaded into the latter to form a bottom closing this end of the housing.

As is apparent from FIG. 1, moreover, the end of the housing 1 receiving the unit 4 may be provided with a mouth or recess portion 8 dimensioned to accommodate the unit 4.

As is also apparent from FIGS. 1–4, the cap 7 is carried by the bottom part 5 but, upon the development of gas in a cartridge 9 which is threaded into the seat 6, the gas pressure is applied through the passage 40 in the cartridge to drive the cap 7, constituting a hollow piston, directly downwardly and thus to force the lubricant out of the passage 3. The gas generator can comprise an operating battery 12, in the battery compartment which can produce an electric current and generating the electrolyzing action to form the gas (e.g. oxygen or hydrogen). Reference may be had to German patent document 35 32 335 which shows a galvanic cell producing hydrogen or oxygen under the control of an electric current.

For switching the circuit on or off, a switching device 13 can be provided. That device has been symbolically shown in FIG. 5 as an electric switch but will be understood to be separable contacts of any type or may even be part of the potentiometer to be described hereinafter.

Figure 4:
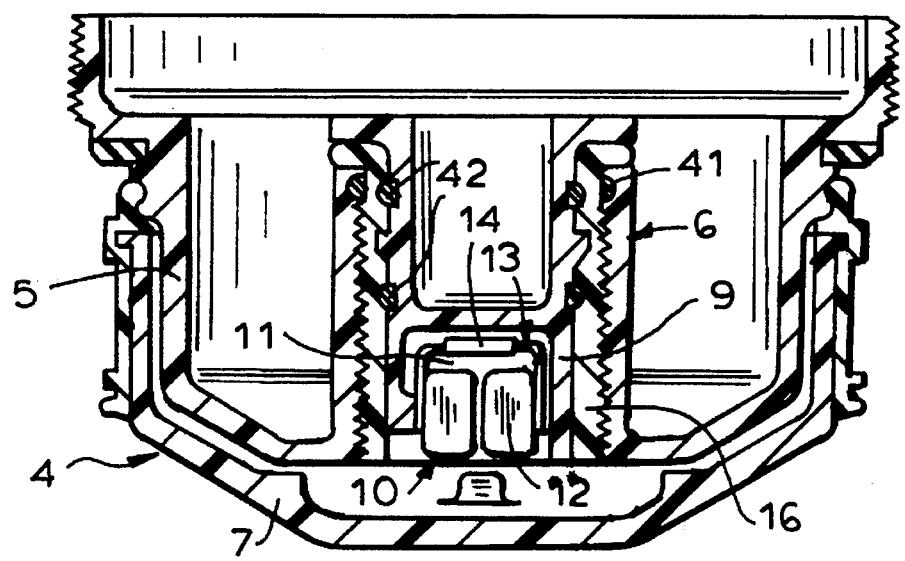
FIG. 4 is a cross sectional view of a gas-generating unit in accordance with another embodiment of the invention.

As is especially apparent from FIGS. 3 and 4, the cover cap 7 is formed as a piston which may be released from its engagement in the groove 32 and forced downwardly by gas pressure when the operating battery 12 is switched on to generate gas. The operating battery is juxtaposed with a potentiometer resistance 14 (see FIG. 5 where the equivalent circuit including the potentiometer is shown) which is also received in the cartridge 9. The potentiometer 14 is so configured that it can vary the rate of current flow from the battery 12 to generate gas in the compartment 11 until the battery 12 is fully discharged. By controlling the gas-generating rate, the potentiometric resister 14 also controls the lubricant delivery rate.

As can be seen from FIGS. 1–3, the cartridge can be a cylindrical element which is threaded directly into the seat 6 and has an O-ring seal 41 sealing against the latter. A cover 15 seals the interior of the cartridge 10 against the exterior.

In the embodiment of FIG. 4, the cartridge 9 is received in a cylindrical sleeve 16 and is sealed relative to the latter by O-rings 42, the sleeve 16 being threaded into the seat 6 and being sealed by the O-ring 41.

I claim:

1. A lubricant dispenser for gas-controlled feed of a lubricant to a machine, said dispenser comprising:

a receptacle for a lubricant to be dispensed;

a machine-connection fitting on one side of said receptacle and provided with a passage communicating with lubricant in said receptacle for delivering said lubricant to the machine;

a gas-generating cell receivable in an opposite side of said receptacle and constituting a single unit mounted in said receptacle and replaceable as a unit therein, said gas-generating cell comprising:

a bottom-forming part sealingly fitting in said receptacle and formed with a cartridge seat having an opening, a cap fitting over said bottom-forming part and engaging same, said cap forming a piston releasable from said bottom-forming part, displaceable in said receptacle and forcing said lubricant through said passage, and a gas-generating cartridge receivable in said cartridge seat and including a gas-generating and current-generating galvanic cell energizable and deenergizeable to selectively produce gas driving said piston.

2. The lubricant dispenser defined in claim 1 wherein said galvanic cell is connected in circuit with a potentiometer, said potentiometer being adjustable to control the generation of gas by said galvanic cell and release of lubricant from said receptacle.

3. The lubricant dispenser defined in claim 1 wherein said cartridge has a cylindrical configuration and is threadedly engageable in said seat, said cartridge further comprising a cover for sealingly closing the interior of said cartridge.

4. The lubricant dispenser defined in claim 1 wherein said cartridge is received in an externally threaded cylindrical sleeve threadedly engageable in said seat and is sealed against the exterior.

5. The lubricant dispenser defined in claim 1 wherein said receptacle is composed of an injection-molded synthetic resin.

6. The lubricant dispenser defined in claim 1 wherein said bottom-forming part is composed of an injection-molded thermoplastic synthetic resin.

7. The lubricant dispenser defined in claim 1 wherein said cartridge is formed of an injection-molded synthetic resin.

8. The lubricant dispenser defined in claim 1 wherein said cap is formed from an injection-molded synthetic resin.

\* \* \* \* \*